United States Patent Office 3,182,060
Patented May 4, 1965

3,182,060
N,N'-DISUBSTITUTED DICARBOXAMIDES AND DITHIOCARBOXAMIDES PREPARED FROM MONOENAMINES
Glenn A. Berchtold, Watertown, Mass., assignor to E. I. du Pont de Nemours and Company, Wilmington, Del., a corporation of Delaware
No Drawing. Filed Aug. 21, 1961, Ser. No. 132,592
7 Claims. (Cl. 260—247.2)

This invention relates to novel N,N'-disubstituted dicarboxamides and N,N'-disubstituted dithiocarboxamides.

It is an object of the present invention to provide novel compositions. A further object is to provide novel N,N'-disubstituted dicarboxamides. A still further object is to provide novel N,N'-disubstituted dithiocarboxamides. Yet another object is to provide a process for preparing these novel compositions by reacting monoisocyanates and/or monoisothiocyanates with monoenamines. Other objects will appear hereinafter.

These and other objects of this invention are accomplished by providing compounds of the formula

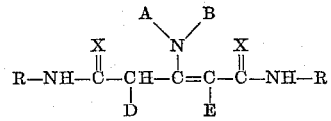

where A, B, D and E, which can be the same or different, are hydrocarbon or substituted hydrocarbon radicals, inert towards isocyanates and enamines; R is an aromatic radical; X is S or O; with the provisos that (a) A is joined to the nitrogen atom bearing B through a primary or secondary aliphatic carbon atom; (b) at least one of the pairs A–B and D–E is joined together, said junctions being made directly or through a hetero-atom (S, O, or tertiary N having a hydrocarbon radical attached thereto) to form a 5 to 7 membered ring; (c) any aliphatic carbon atom joining B to the nitrogen atom bearing A is primary or secondary. In particular A, B, D, and E can be aliphatic, aromatic, aromatic-substituted aliphatic, and aliphatic-substituted aromatic hydrocarbon radicals. In turn, these radicals can bear non-hydrocarbon substituents unreactive toward enamines and isocyanates; representative examples include nitro, alkoxy, aryloxy, thioalkoxy, and thioaryloxy groups.

Representative examples of compounds within the scope of the present invention include:

N,N'-bis(p-fluorophenyl)-2-(dimethylamino)-1-cyclopentene-1,3-dithiocarboxamide;
N,N'-dibenzyl-2-(butylpropylamino)-5-tertbutyl-1-cyclopentene-1,3-dicarboxamide;
N,N'-diphenylyl-2-(diisoamylamino)-5-cyclopentyl-1-cyclopentene-1,3-dithiocarboxamide;
N,N'-bis(2-naphthyl)-2-(methyl-α-phenethylamino)-1-cyclohexene-1,3-dicarboxamide;
N,N'-bis(1-naphthyl)-2-(N-methyl-o-chloroanilino)-6-tert-butyl-5-dimethyl-1-cyclohexene-1,3-dithiocarboxamide;
N,N'-bis(p-bromophenyl)-2-(N-isoamylanilino)-5-methoxy-1-cyclohexene-1,3-dicarboxamide;
N,N'-diphenyl-2-(N-methylanilino)-1-cycloheptene-1,3-dithiocarboxamide;
N,N'-bis(p-hexadecylphenyl)-3-piperidino-2-pentene-2,4-dicarboxamide;
N,N'-bis(p-fluorophenyl)-3-piperidino-3-heptene-2,4-dithiocarboxamide;
N²-phenyl-N⁴-p-tolyl-3-(3-isopropylpiperidino)-5-methyl-3-hexene-2,4-dicarboxamide;
N⁴-(1-naphthyl)-N²-phenyl-3-piperidino-3-hendecene-2,4-dicarboxamide;
N³-biphenylyl-N⁵-p-bromophenyl-4-(2-benzylpiperidino)-3-heptene-3,5-dithiocarboxamide;
N³-phenyl-N⁵-m-tolyl-4-(3-oxazolidinyl)-4-octene-3-thiocarboxamide-5-carboxamide;
N,N'-bis(p-chlorophenyl)-4-(5-phenyl-3-oxazolidinyl)-4-hendecene-3,5-dithiocarboxamide;
N,N'-bis(3-pyrenyl)-9-(2-butyl-1-pyrrolidyl)8-heptadecene-8,10-dicarboxamide;
N,N'-bis[4(4-pentenyl)phenyl]-6-(4-homomorpholinyl)-6-dodecene-5,7-dicarboxamide;
N,N'-diphenyl-6-(4-homomorpholinyl)-6-dodecene-5,7-dithiocarboxamide;
N,N'-dibenzyl-7-morpholino-7-hexadecene-6,8-dicarboxamide;
N,N'-diphenyl-11-thiomorpholino-1-eicosene-10,12-dithiocarboxamide;
N,N'-bis(p-hexadecyloxyphenyl)-14-homomorpholino)-13-heptacosene-13,15-dicarboxamide;
N,N'-diphenyl-18-(2,6-dimethyl-morpholino)-17-pentatriacontene-17,19-dithiocarboxamide;
N,N'-bis(o-chlorophenyl)-2-piperidino-1-cyclopentene-1,3-dicarboxamide;
N,N'bis(2,6-xylyl)-2-(2,5-diethyl-piperidino-5-tert-butyl-1-cyclopentene-1,3-dithiocarboxamide;
N,N'-bis(p-carbomethoxyphenyl)-2-piperidino-1-cyclohexene-1,3-dicarboxamide;
N,N'-bis(2-phenethyl)-2-[2-(p-chlorophenyl)-piperidino]-1-cyclohexene-1,3-dicarboxamide;
N,N'-diphenyl-2-[3-(3-phenylbutyl)-piperidino]-5-isoamyloxy-1-cyclohexene-1,3-dithiocarboxamide;
N,N'-di(2-naphthyl)-5-heptyl-2(2-methyl-3-oxazolidinyl)-1-cyclohexene-1,3-dicarboxamide;
N,N'-bis(5-dodecyl-2-methylphenyl)-2-(2-methyl-homopiperidino)-1-cyclopentene-1,3-dicarboxamide;
N,N'-bis(p-dimethylaminophenyl)-2-(2-methylhomopiperidino)-1-cyclopentene-1,3-dithiocarboxamide;
N,N'-diphenyl-2-morpholino-1-cyclohexene-1,3-dicarboxamide;
N,N'-diphenyl-2-morpholino-1-cyclohexene-1,3-dicarboxamide;
N,N'-bis(p-ethoxyphenyl)-2-thiamorpholino-1-cyclopentene-5-propyl-1,3-dicarboxamide;
N,N'-bis(p-fluorophenyl)-2-thiamorpholino-1-cyclopentene-5-propyl-1,3-thiocarboxamide;
N,N'-bis(p-tolyl)-4-methyl-2-homomorpholino-1-cyclohexene-1,3-dicarboxamide;
N,N'-bis(p-hexadecyloxyphenyl)-2-(2,6-dimethylmorpholino-5-methyl-1-cyclopentene-1,3-dithiocarboxamide;
N,N'-bis(4-biphenyl)-2-(2-ethylmorpholino)-1-cyclopentene-1,3-carboxamide;
N,N'-bis(2-naphthyl)-2-(2-propyl-piperidino)-5-benzyl-1-cyclohexene-1,3-dicarboxamide;
N,N'-diphenyl-2-(N-heptadecylanilino)-1-cyclohexene-1,3-dicarboxamide;
N,N'-diphenyl-2-(hexadecylmethylamino)-1-cyclopentene-1,3-dithiocarboxamide;
N,N'-bis(p-chlorophenyl)-3-(6-methyl-4-isopropyl-1-tetrahydro-1,3-oxazinyl)-2-pentene-2,4-dicarboxamide;
N,N'-diphenyl-3-(4-isobutyl-6-methyl-1-tetrahydro-1,3-oxazinyl)-2-hexene-2,4-dithiocarboxamide;
N,N'-bis(p-tolyl)-7-(4-methyl-1-piperazinyl)-7-hexadecene-6,8-dicarboxamide;
N,N'-bis(m-nitrophenyl)-2-(4-dodecyl-1-piperazinyl)-1-cyclopentene-1,3-dithiocarboxamide and
N,N'-diphenyl-2-(4-phenyl-1-piperazinyl)-1-cyclohexene-1,3-dithiocarboxamide.

The compounds of the present invention are made by reacting about 2 moles of an organic monoisocyanate (or monoisothiocyanate) with one mole of a monoenamine.

A solvent, is generally employed for operating convenience although its use is optional. Addition of reactants can be made in any order, at one time or intermittently or continuously. Impurities reactable with enamines or isocyanates should be excluded. The reaction temperature is not critical; representative values range from room temperature (20–30° C.) to about 160° C., 80 to 100° C. frequently being preferred. Representative reaction times range from 1 to 48 hours. For a particular set of reactants, the time required will be shorter, the higher the temperature used.

If a smaller proportion of organic isocyanate is supplied than stated above, dicarboxamide formation will be incomplete. For example, the monocarboxamide will be the product when the molar ratio of isocyanate to enamine has a value of 1:1. Proportions higher than 2:1 may be used but are unnecessary and may lead to undesired by-products resulting from reaction of the excess organic isocyanate with the carboxamide groups. Similar results occur when organic isothiocyanates are used.

Unsymmetrical products can be made by reacting a monoenamine with a molar proportion of one R—N=C=X compound and then adding a molar proportion of a different R—N=C=X compound. This sequential reaction procedure thus permits one to make unsymmetrical dicarboxamides, unsymmetrical dithiocarboxamides, and enamines bearing both a carboxamide and a thiocarboxamide group.

As previously mentioned, the dicarboxamides and dithiocarboxamides are frequently made in an inert liquid medium. This medium will usually dissolve the reactants; it may disperse the product as well. The concentration of reactants is not critical; ease of stirring and other factors of operating convenience will determine the maximum concentration chosen by those skilled in the art. Concentrations in the range 10–70 grams of reactants per 100 milliliters of solvent have proved useful, 10–40 grams sometimes being preferred. Aromatic hydrocarbons (such as benzene, toluene, and m-xylene) are particularly useful solvents. Aliphatic hydrocarbons (such as n-pentane) can be employed; the product frequently is insoluble, precipitating during the reaction. Aliphatic acyclic ethers (such as diethyl ether), cyclic ethers (such as tetrahydrofuran), lower alkyl esters (such as ethyl acetate), and selected unsaturated chlorinated hydrocarbons (such as o-dichlorobenzene, trichloroethylene, and tetrachloroethylene) are alternative liquid media. Mixtures of two or more miscible liquid solvents can be employed, when desired. The dicarboxamides and dithiocarboxamides can be isolated by conventional means. Precipitates can be collected by filtration or centrifugation. Soluble product can be freed from solvent by evaporation, spray drying, or drum drying, or by admixture with non-solvents.

Any aromatic monoisocyanate or monoisothiocyanate compound may be employed in making the compounds of the present invention. The R radical in the above formula is, of course, derived from this reactant. Any substituents on R should be inert toward enamines and isocyanates. It is preferred that R contain from about 6 to 22 carbon atoms. Mixtures of these compounds can be employed when desired.

Representative organic monoisocyanates include
phenylisocyanate,
p-chlorophenylisocyanate,
o-tolylisocyanate,
m-nitrophenylisocyanate,
m-bromophenylisocyanate,
p-methoxyphenylisocyanate,
p-carbomethoxyphenylisocyanate,
4-biphenylisocyanate,
p-dimethylaminophenylisocyanate,
4-ethyl-6-nitro-o-tolylisocyanate,
m-fluorophenylisocyanate,
2,3,5,6-durylisocyanate,
2,4,6-mesitylisocyanate,
1-naphthylisocyanate,
2-naphthylisocyanate,
5-nitro-1-naphthylisocyanate,
4(4-pentenyl)-phenyl-isocyanate,
3-isocyanatopyrene,
benzylisocyanate,
3-chlorobenzylisocyanate and
4-ethoxybenzylisocyanate;
2-phenethylisocyanate;
p-hexadecylphenyl isocyanate;
5-dodecyl-2-methyl-phenylisocyanate;
4-dodecyl-3-nitrophenylisocyanate;
p-hexadecyloxyphenylisocyanate;
2-thiododecyl isocyanate; and
2-oxadodecylisocyanate.

Representative examples of monoisothiocyanates include: phenyisothiocyanate; o-tolylisothiocyanate; p-tolylisothiocyanate; p-bromophenylisothiocyanate; p-fluorophenylisothiocyanate; 2,6-xylylisothiocyanate; p-chlorophenylisothiocyanate; 4-biphenylylisothiocyanate; phenethylisothiocyanate; 1 - naphthylisothiocyanate; and p-nitrophenylisothiocyanate. The monoisothiocyanates can be prepared from the corresponding monoisocyanates by reacting 2.5 to 3 moles of the latter with one mole of phosphorus pentasulfide according to the general procedure of U.S. Patent 2,681,358. The isothiocyanates can also be made from the corresponding primary monoamines by the method of Organic Syntheses, Collective Volumes I (pages 165, 447) and III (page 599), John Wiley & Sons, Inc., New York.

The enamines used in making the compounds of the present invention have the structure

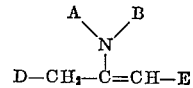

$$D-CH_2-C=CH-E$$

where A, B, D, and E, which may be the same or different, are hydrocarbon or substituted hydrocarbon radicals, preferably from about 1 to 18 carbon atoms, inert toward isocyanates and enamines, with the provisos that (a) A is joined to the nitrogen atom bearing B through a primary or secondary aliphatic carbon atom; (b) at least one of the pairs A–B and D–E is joined directly or through a heteroatom (S, O, or tertiary nitrogen having a hydrocarbon radical attached thereto) to form a 5 to 7 membered ring; (c) any aliphatic carbon atom in B joining B to the nitrogen atom bearing A is primary or secondary. Thus A, B, D and E can be aliphatic (e.g., lower alkyl) and aromatic substituted aliphatic (e.g., benzyl) hydrocarbon radicals. B, D, and E can also be aromatic (e.g., phenyl, naphthyl, or biphenylyl) or aliphatic substituted aromatic hydrocarbon radicals (e.g., xylyl, tolyl). In addition, A, B, D, and E can bear non-hydrocarbon substituents unreactive toward isocyanates and enamines. Representative examples of suitable substituents include alkoxy, aryloxy, thioalkoxy, thioaryloxy, and nitro. Groups bearing Zerewitinoff-active hydrogen atoms are absent.

Representative examples of these enamines include:

N,N-diethyl-1-cyclopenten-1-ylamine;
4-ethyl-N,3-dimethyl-N-isopropyl-1-cyclopenten-1-ylamine;
N-butyl-3-tert-butyl-N-propyl-1-cyclopenten-1-ylamine;
N,N-diisoamyl-3-cyclopentyl-1-cyclopenten-1-ylamine;
N-ethyl-N-cyclohexyl-3,4-diphenyl-1-cyclopenten-1-ylamine;
N-methyl-N-(α-phenethyl)-1-cyclohexen-1-ylamine;
N-ethyl-3-methyl-N-(2-naphthyl)-1-cyclohexen-1-ylamine;
1-(N-methyl-o-chloroanilino)-3-tert-butyl-4,4-dimethyl-1-cyclohexene;
1-(N-isoamylanilino)-4-methoxy-1-cyclohexene;
1-(2-penten-3-yl)-piperidine;

1-(3-hepten-3-yl)-3-methyl-piperidine;
3-isopropyl-1-(1-ethyl-1-isopenten-1-yl)-piperidine;
1-(3-nonen-3-yl)-3-phenyl-piperidine;
2-benzyl-1-(3-hepten-4-yl)-piperidine;
4,4-dimethyl-3-phenyl-1-(6-methyl-3-hepten-3-yl)-piperidine;
3-(4-octen-4-yl)-oxazolidine;
2,4-dimethyl-3-(4-nonen-4-yl)-oxazolidine;
3-(4-hendecen-4-yl)-5-phenyl-oxazolidine;
1-(7-pentadecen-8-yl)-pyrrolidine;
2-n-butyl-1-(8-heptadecen-9-yl)-pyrrolidine;
3-ethyl-1-(6-dodecen-6-yl)-4-phenyl-pyrrolidine;
1-(6-pentadecen-6-yl)-hexamethyleneimine;
4-(7-hexadecen-7-yl)-morpholine;
1-(10-heneicosen-11-yl)-thiamorpholine;
4-(13-heptacosen-14-yl)-homomorpholine;
1-(7-hexadecen-7-yl)-4-methyl-piperazine;
2,6-dimethyl-1-(17-pentatriaconten-18-yl)-morpholine;
1-(1-cyclopenten-1-yl)-piperidine;
2-methyl-1-(3-propyl-1-cyclopenten-1-yl)-piperidine;
2,5-diethyl-1-(3-tert-butyl-1-cyclopenten-1-yl)piperidine;
2(p-chlorophenyl)-1-(1-cyclohexen-1-yl)-piperidine;
2-(7-methoxyheptyl)-1-(3-benzyl-1-cyclohexen-1-yl)-piperidine;
3-(3-phenylpropyl)-1-(4-amyloxy-1-cyclohexen-1-yl)-piperidine;
2-methyl-3-(4-heptyl-1-cyclohexen-1-yl)-oxazolidine;
3,3-diphenyl-1-(5-ethyl-3-methyl-1-cyclohexen-1yl)-pyrrolidine;
2-methyl-1-(1-cyclopenten-1-yl)-hexamethyleneimine;
4-(1-cyclohepten-1-yl)-morpholine;
5-ethyl-4(1-cyclohexen-1-yl)-2-methyl morpholine
4-(3-propyl-1-cyclopenten-1-yl)-thiamorpholine;
4-(4-methyl-1-cyclohexen-1-yl)-homomorpholine;
6-methyl-3(2-penten-3-yl)-4-isopropyl-tetrahydro-1,3-oxazine;
4-dodecyl-1-(1-cyclopenten-1-yl)-piperazine; and
4-(phenyl)-1-(1-cyclohexen-1-yl)-piperazine.

The enamines used in preparing the compounds of the present invention can be made by reacting a ketone

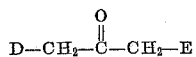

with at least a molar proportion of a secondary amine

where A, B, D, and E have the same meanings previously stated. Frequently about 1.5 to 2 molar proportions of amine are employed. Preferably the condensation is carried out in an inert water-immiscible solvent. By "inert" is meant a solvent which will not affect the desired course of reaction; thus the medium is free from enamine-reactable compounds such as alkyl halides, allylic halides, acyl halides, benzyl halides, water, cyanogen chloride, $\alpha,\beta$-unsaturated nitriles, $\alpha,\beta$-unsaturated ketones, and $\alpha,\beta$-unsaturated esters; furthermore, it is free of acid functions which would tie up the amine and of groups which might tie up the ketone, e.g., vicinal glycols which could form ketals. Aliphatic and aromatic hydrocarbons are preferred, benzene and toluene being particularly preferred. The concentration of reactants is not critical. Frequently about 10–70 grams of reactants are employed for every 100 milliliters of solvent. A catalyst is optional; occaabout 10–70 grams of reactants are employed for every for every gram-mole of ketone. The reaction temperature is not critical; temperatures between about 80 and 120° C. are often very satisfactory. The progress of the reaction can be followed by measuring the amount of water which is formed. The reaction time needed will frequently range between about 10 to 300 hours, 10–50 often sufficing. The lower the temperature and the more sterically hindered the reactants, the longer the time. In a representative procedure a solution of 30 grams of cyclopentanone and 46.5 grams of morpholine in 300 milliliters of toluene are refluxed at atmospheric pressure under a water separator (e.g., Dean-Stark tube) for 20–30 hours. The solvent is then removed by distillation at atmospheric pressure and the residue fractionated through a Vigreux column. Examples of preparations of this type are given in the Ph D. thesis of A. A. Brizzolara (Columbia University, 1960). Enamines can be made by the method described in U.S. Patent 2,773,087. The procedures disclosed in Methoden der Organischen Chemie, Houben-Weyl, vol. II (Stickstoff verbindungen), page 171, are also useful.

The enamine derivatives of the present invention having at least one, preferably two, thioamide groups are very useful as accelerators for curing polychloroprene with magnesia and zinc oxide. Optional additives such as carbon black, detackifiers, antioxidants, and the like can be present. Those skilled in the art will recognize that the concentrations of curing agents and accelerators and the particular combination of the optional compounding ingredients used will depend upon the specific application for which the vulcanizate is intended. It has been found advantageous to use enough of the enamine to supply about 0.10 to 0.15 part of sulfur for every 100 parts of polychloroprene by weight. A representative recipe contains (by weight): 100 parts of Type W Neoprene, 1 part of N-phenyl-$\beta$-naphthylamine, 0.5 part of stearic acid, 29 parts of SRF black, 4 parts of MgO, 6.5 parts of ZnO, and 1.0 part of N,N'-diphenyl-2-(1-pyrrolidyl)-1-cyclohexene-1,3-dithiocarboxamide. The composition is cured at 153° C. for 30 minutes. Further information about polychloroprene compounding and, in particular, its curing with magnesia and zinc oxide is to be found in the following publications: The Neoprenes, by Neil L. Catton, 1953, Rubber Chemicals Division, E. I. du Pont de Nemours & Co. (Inc.), Wilmington, Delaware; Introduction to Rubber Technology, ed. by M. Morton, 1959, Reinhold Publishing Corporation, New York; Synthetic Rubber, G. S. Whitby, Ed.-in-Chief, 1954, John Wiley & Sons, Inc., New York; Synthetic Rubber Technology, vol. I, W. S. Penn, 1960, Maclaren & Sons, Ltd., London. The dicarboxamides may be used as light stabilizers to prevent dye fading of various synthetic fabrics which have been dyed with azo type dyes.

The following examples will better illustrate the nature of the present invention; however, the invention is not intended to be limited to these examples. Parts are by weight unless otherwise indicated.

EXAMPLE 1

*Preparation of N,N'-bis(p-tolyl)-2-morpholino-1-cyclohexene-1,3-dicarboxamide*

A solution of 8.3 grams of 4-(1-cyclohexen-1-yl) morpholine and 13.3 grams of p-tolyl isocyanate in 100 milliliters of benzene was heated at reflux temperature for 24 hours while protected from atmospheric moisture. Afterward when the solution had been cooled to room temperature, 15.4 grams (71%) of the dicarboxamide crystallized from it. This compound melted at 209° after three recrystallizations from $CH_2Cl_2$-pet. ether.

*Analysis.*—Calc. for $C_{26}H_{31}O_3N_3$: C, 72.03; H, 7.21; N, 9.69. Found: C, 72.3, 72.1; H, 7.4, 7.1; N, 9.58, 9.66.

EXAMPLE 2

*Preparation of N,N'-bis(p-chlorophenyl)-2-morpholino-1-cyclohexene-1,3-dicarboxamide*

A solution of 8.3 grams of 4-(1-cyclohexen-1-yl) morpholine and 15.3 grams of p-chlorophenyl isocyanate in 100 milliliters of benzene was heated under reflux for 21 hours while protected from atmospheric moisture. After the solution had been subsequently allowed to cool to room temperature, it was poured into petroleum ether. The gummy precipitate, which resulted, was dissolved in methylene chloride. Petroleum ether was then added. After long standing, the solution deposited crystals (12.0 grams, 51%) of the dicarboxamide. Upon three recrystallizations from $CH_2Cl_2$-pet. ether, this compound had an M.P. of 159° (after change of crystalline form at 152–154°).

*Analysis.*—Calcd. for $C_{24}H_{25}O_3N_3Cl$: C, 60.76; H, 5.31; Cl, 14.94. Found: C, 60.6, 60.4; H, 5.3, 5.1; Cl, 15.0, 15.0.

EXAMPLE 3

*Preparation of N,N'-diphenyl-2-(1-pyrrolidyl)-1-cyclopentene-1,3-dithiocarboxamide*

A solution of 19.0 grams of phenyl isothiocyanate in 100 milliliters of benzene was stirred and cooled in an ice water bath while protected from atmospheric moisture. A solution of 9.4 grams of 1-(1-cyclopenten-1-yl)pyrrolidine in 30 milliliters of benzene was added dropwise over a 10–15 minute period during which time the temperature rose from 13° to 18°. The solution was allowed to stand 2 days. The heavy yellow precipitate (A) which formed was collected by filtration. It weighed 24.7 grams. Addition of pet.-ether to the filtrate gave a second crop (B), 2.6 grams, M.P. 86–90°. Four recrystallizations of (B) on a small scale from ethyl acetate gave the dithiocarboxamide.

EXAMPLE 4

*Preparation of N,N'-diphenyl-2-(2,6-dimethylmorpholino)-1-cyclohexene-1,3-dicarboxamide*

Seventeen grams of phenyl isocyanate and 21 grams of 4-(1-cyclohexene-1-yl)-2,6-dimethylmorpholine were stirred together at room temperature. Much heat was evolved. When cooled, the composition solidified to a white powdery solid melting at 152–154° C. (recrystallized from ethanol).

*Analysis.*—Calcd. for $C_{26}H_{34}N_3O_3$: C, 71.5; H, 7.8; N, 9.6. Found: C, 71.6; H, 7.2; N, 9.7.

EXAMPLE 5

*Preparation of N,N'-diphenyl-2(di-n-butylamino)-1-cyclohexene-1,3-dicarboxamide*

To a stirred solution of 10.0 grams of N,N-di-n-butyl-1-cyclohexen-1-yl amine in 80 milliliters of dioxane was added 11.4 grams of phenyl isocyanate and 20 milliliters of dioxane. There was a slight exothermic effect. The solution, while protected from atmospheric moisture, was refluxed for one hour and then allowed to stand overnight. The resulting clear solution was concentrated by distillation under reduced pressure to give a partly crystalline residue which was dissolved in hot chloroform and filtered. Evaporation of the filtrate and drying of the residue in a vacuum desiccator gave a solid product, 20.1 grams, M.P. 125–129°. It was recrystallized twice from ethyl acetate-pet.-ether to raise the M.P. to 136–138° and 139–140°, respectively. A third recrystallization from ethyl acetate-pet.-ether gave the analytical sample, white needles, M.P. 141°. The results show that the product is the dicarboxamide, yield 94%.

EXAMPLE 6

*Preparation of N,N'-diphenyl-3-morpholino-2-pentene-2,4-dicarboxamide*

To 4.0 grams of 4-(2-penten-3-yl)morpholine in 25 milliliters of dioxane was added 6.5 grams of phenyl isocyanate. The solution, which immediately became warm, was allowed to stand at ambient temperature for 4 days while protected from atmospheric moisture. Most of the solvent was then removed by distillation under reduced pressure. The residual thick liquid was dissolved in warm chloroform. The solution obtained was filtered and the filtrate was diluted with pet.-ether to induce crystallization. The product, collected by filtration, weighed 6.3 grams, M.P. 126–128°. On recrystallization from chloroform, a compound melting at 194–196° first separated. Addition of petroleum ether to the filtrate gave the principal component, M.P. 138–140°. The first compound (M.P. 194–196° C.) was recrystallized twice from chloroform and once from ethyl acetate to give sample A, M.P. 197°. The second compound was recrystallized twice from $CHCl_3$-pet. ether and twice from ethyl acetate to give sample B, M.P. 140°. Sample B, the main product, is the adduct of 2 moles of isocyanate with one of enamine.

*Analysis.*—Calc. $C_{23}H_{27}O_3N_3$: C, 70.21; H, 6.92; N, 10.68. Found: N, 10.55.

The higher melting product A is apparently the ketone resulting from hydrolysis of B.

*Analysis.*—Calcd. for $C_{19}H_{20}O_3N_2$: C, 70.35; H, 6.22; N, 8.64. Found: N, 9.10.

EXAMPLE 7

*Preparation of N,N'-diphenyl-2-morpholino-1-cyclopentene-1,3-dicarboxamide*

Phenyl isocyanate (3.50 grams) and 4-(1-cyclopenten-1-yl) morpholine (2.25 grams) were mixed in 20 milliliters of benzene under a nitrogen atmosphere, shaken, and allowed to stand for 48 hours. Pentane (25 milliliters) was added and the precipitate was collected by suction filtration and dried to give 5.12 grams (89%) of product. Recrystallizations from 1:1 methanol-benzene and from acetonitrile gave 3.09 grams of product, M.P. 140.1–143.2°.

*Analysis.*—Calcd. for $C_{23}H_{25}N_3O_3$: C, 70.60; H, 6.45; N, 10.74. Found: C, 70.36; H, 6.41; N, 10.68.

EXAMPLE 8

*Preparation of N,N'-diphenyl-2-morpholino-1-cyclohexene-1,3-dicarboxamide*

Phenyl isocyanate (5.96 grams) and 4-(1-cyclohexen-1-yl) morpholine (4.43 grams) were dissolved in 50 milliliters of benzene and heated under reflux on a steam bath for one hour. The benzene was removed under reduced pressure and the residue was recrystallized from acetonehexane to give 8.52 grams (82%) of product, M.P. 189–192°. A further recrystallization raised the melting point to 191.4–192.8°.

*Analysis.*—Calcd. for $C_{24}H_{27}N_3O_3$: C, 71.09; H, 6.71; N, 10.36. Found: C, 70.79; H, 6.57; N, 10.34.

EXAMPLE 9

*Preparation of N,N'-diphenyl-2-morpholino-1-cycloheptene-1,3-dicarboxamide*

Phenyl isocyanate (2.24 grams) and 4-(1-cyclohepten-1-yl)morpholine (1.71 grams) were mixed in 25 milliliters of benzene under a nitrogen atmosphere and heated under a gentle reflux for 3 hours. The mixture was cooled to room temperature and the benzene was removed under reduced pressure. The residue was recrystallized from 1:1 cyclohexane-benzene to give 2.07 grams (52%) of product, M.P. 154.5–156.3°. Addition of pentane yielded an additional 1.02 grams (26%). A second recrystallization raised the melting point to 155.2–157.1°.

*Analysis.*—Calcd. for $C_{25}H_{29}N_3O_3$: C, 71.58; H, 6.97; N, 10.02. Found: C, 72.03, C, 71.10, C, 72.09; H, 6.81, H, 6.70, H, 7.01; N, 10.09.

EXAMPLE 10

*Preparation of N,N'-bis(o-methoxyphenyl)-2-(1-pyrrolidyl)-1-cyclopentene-1,3-dicarboxamide*

A solution of 11.0 grams of o-methoxyphenyl isocyanate in 20 milliliters of dioxane was added to 5 grams of 1-(1-cyclopenten-1-yl) pyrrolidine in 80 milliliters of dioxane. Heat was evolved. The solution was allowed to stand while protected from atmospheric moisture for 2½ days. The solvent was then removed by evaporation under reduced pressure to leave a very thick liquid. A crystallization attempt from $CHCl_3$-pet. ether was unsuccessful. The product was sparingly soluble in hot ether. Leaching with hot ether gave on cooling a sticky solid. Another crystallization from ether gave a solid but no crystals.

EXAMPLE 11

*Preparation of N,N'-bis(m-tolyl)-2-(N-methylanilino)-1-cyclohexene-1,3-dicarboxamide*

A solution of 7.2 grams of m-tolyl isocyanate in 20 milliliters of dioxane was added to 5.0 grams of 1-(N-methylanilino)-1-cyclohexene in 30 milliliters of dioxane. There was no heat effect. After the solution had stood under a drying tube for 3 days, the solvent was removed by distillation under reduced pressure to leave a very thick oil.

EXAMPLE 12

*Preparation of N,N',1,3-tetraphenyl-2-(1-pyrrolidyl-1-propene-1,3-dicarboxamide*

A solution of 6.0 grams of phenyl isocyanate in 10 milliliters of dioxane was added to 6.6 grams of 1-(β-benzyl-β-styryl)-pyrrolidine in 10 milliliters of dioxane. There was no heat effect. After the solution had stood while protected by a drying tube for 3½ days, concentration by evaporation under reduced pressure gave a very thick oil.

EXAMPLE 13

Type W Neoprene was compounded on a rubber roll mill with N,N'-diphenyl-2-(1-pyrrolidyl)-1-cyclopentene-1,3-dithiocarboxamide. Table I, which follows, shows the recipes used, cure conditions, and the properties of the vulcanizates:

TABLE I.—VULCANIZATION OF NEOPRENE BLACK STOCK

| | Parts |
|---|---|
| Type W Neoprene | 100 |
| Neozone D | 1 |
| Stearic acid | 0.5 |
| SRF black | 29 |
| Magnesium oxide | 4 |
| Zinc oxide | 5 |
| Enamine | 1 |

Mooney scorch small rotor, 250° F.:

| | |
|---|---|
| Minimum | 26 |
| Minutes to 10 pt. rise | 12 |
| Minutes to 20 pt. rise | 17 |

Cure: 30 min./307° F.:

| | |
|---|---|
| $M_{100}$ | 355 |
| $M_{300}$ | 2000 |
| $T_B$ | 2835 |
| $E_B$ | 380 |
| Yerzley resilience, 25° C. | 73 |
| Percent compression set, 70 hr./100° C. | 30 |
| Shore hardness | 55 |

EXAMPLE 14

A. *Preparation of cellulose acetate films containing enamine dicarboxamides*

Three 0.5-gram samples of cellulose acetate were each dissolved in 35 milliliters of acetone. Solution A was the control. To Solutions B–C were added 0.05-gram samples of N,N'-diphenyl-2-morpholino-1-cyclohexene-1,3-dicarboxamide, and N,N'-bis(p-chlorophenyl)-2-morpholino-1-cyclohexene-1,3-dicarboxamide, respectively. Films A–C were cast from these solutions by evaporation in aluminum dishes. Irradiation for 24 hours with a General Electric sunlamp at a 6"-distance caused no change in their appearance.

B. *Use of enamine dicarboxamides to prevent dye fading*

Film A (control) and Films B–C made in Part A above were placed on "Dacron" polyester fiber cloth which had been dyed with a red azo dye

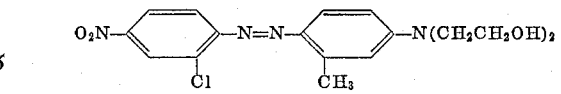

They were then irradiated with a General Electric sunlamp at a 6"-distance for 3 hours. The uncovered cloth and that covered by Film A were very faded. In contrast, the cloths covered by Films B–C containing the enamine dicarboxamides were unchanged.

As many widely different embodiments of this invention may be made without departing from the spirit and scope thereof, it is to be understood that this invention is not limited to the specific embodiments thereof except as defined in the appended claims.

What is claimed is:

1. N,N'-diphenyl - 2 - morpholino-1-cyclohexene-1,3-dicarboxamide.
2. N,N'-diphenyl - 2 - (1-pyrrolidyl)-1-cyclopentene-1,3-dithiocarboxamide.
3. N,N'-diphenyl - 3-morpholino-2-pentene-2,4-dicarboxamide.
4. N,N'-1,3-tetraphenyl - 2 - (1-pyrrolidyl-1-propene)-1,3-dicarboxamide.
5. N,N'-bis(p-chlorophenyl) - 2 - morpholino-1-cyclohexene-1,3-dicarboxamide.
6. A compound of the formula

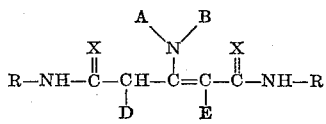

wherein A, B, D and E are radicals, which are inert toward isocyanates and enamines, selected from the group consisting of hydrocarbon and substituted hydrocarbon radicals, said hydrocarbon radicals having from 1 to 18 carbon atoms and said substituents being selected from the group consisting of nitro, alkoxy, aryloxy, thioalkoxy, and thioaryloxy groups; R is a hydrocarbon aromatic radical which is inert toward isocyanates and enamines, said radical having from 6 to 22 carbon atoms; X is selected from the group consisting of sulfur and oxygen; with the proviso that (*a*) A is joined to the nitrogen atom bearing B through a carbon atom selected from the group consisting of primary aliphatic and secondary aliphatic carbon atoms; (*b*) at least one of the pairs A–B and D–E is joined together to form a 5 to 7 membered ring, said junctions being direct junctions of carbon atoms in the case of D–E and in the case of A–B said junctions are selected from the group consisting of direct junctions of carbon atoms and junctions through a hetero-atom, said hetero-atom being selected from the group consisting of sulfur, oxygen and a tertiary nitrogen atom having a hydrocarbon radical attached thereto, said hydrocarbon radical having from 1 to 12 carbon atoms; and (*c*) any aliphatic carbon atom joining B to the nitrogen atom bearing A is selected from the group consisting of primary and secondary aliphatic carbon atoms.

7. A process which comprises reacting 2 moles of a compound of the formula R—NCX, wherein R is a hydrocarbon aromatic radical which is inert toward isocyanates and enamines, said radical having from 6 to 22 carbon atoms and X is selected from the group consisting of sulfur and oxygen with about one mole of a monoenamine of the formula

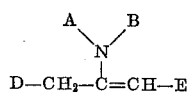

wherein A, B, D and E are radicals, which are inert toward isocyanates and enamines, selected from the group consisting of hydrocarbon and substituted hydrocarbon radicals, said hydrocarbon radicals having from 1 to 18 carbon atoms and said substituents being selected from the group consisting of nitro, alkoxy, aryloxy, thioalkoxy, and thioaryloxy groups; with the provisos that (a) A is joined to the nitrogen atom bearing B through a carbon atom selected from the group consisting of primary aliphatic and secondary aliphatic carbon atoms; (b) at least one of the pairs A–B and D–E is joined together to form a 5 to 7 membered ring, said junctions being direct junctions of carbon atoms in the case of D–E and in the case of A–B said junctions are selected from the group consisting of direct junctions of carbon atoms and junctions through a hetero-atom, said hetero-atom being selected from the group consisting of sulfur, oxygen and a tertiary nitrogen atom having a hydrocarbon radical attached thereto, said hydrocarbon radical having from 1 to 12 carbon atoms; and (c) any aliphatic carbon atom joining B to the nitrogen atom bearing A is selected from the group consisting of primary and secondary aliphatic carbon atoms.

No references cited.

IRVING MARCUS, *Primary Examiner.*

WALTER A. MODANCE, *Examiner.*